(12) United States Patent
Fukasawa et al.

(10) Patent No.: US 10,326,129 B2
(45) Date of Patent: Jun. 18, 2019

(54) ACTIVE MATERIAL, ELECTRODE, NONAQUEOUS ELECTROLYTE SECONDARY BATTERY, BATTERY PACK AND PRODUCTION METHOD OF ACTIVE MATERIAL

(71) Applicant: KABUSHIKI KAISHA TOSHIBA, Minato-ku (JP)

(72) Inventors: Takayuki Fukasawa, Yokohama (JP); Kenji Essaki, Kawasaki (JP); Tomokazu Morita, Funabashi (JP); Takashi Kuboki, Ota (JP); Yasuhiro Goto, Minato (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 319 days.

(21) Appl. No.: 15/125,428

(22) PCT Filed: Mar. 17, 2014

(86) PCT No.: PCT/JP2014/057155
§ 371 (c)(1),
(2) Date: Sep. 12, 2016

(87) PCT Pub. No.: WO2015/140907
PCT Pub. Date: Sep. 24, 2015

(65) Prior Publication Data
US 2017/0092942 A1 Mar. 30, 2017

(51) Int. Cl.
*H01M 4/36* (2006.01)
*H01M 4/133* (2010.01)
(Continued)

(52) U.S. Cl.
CPC ........... *H01M 4/366* (2013.01); *H01M 4/133* (2013.01); *H01M 4/134* (2013.01);
(Continued)

(58) Field of Classification Search
CPC .. H01M 4/366; H01M 10/0525; H01M 4/625; H01M 4/1395; H01M 4/134; H01M 4/133; H01M 4/386
See application file for complete search history.

(56) References Cited

U.S. PATENT DOCUMENTS

2002/0164479 A1  11/2002 Matsubara et al.
2003/0215711 A1  11/2003 Aramata et al.
(Continued)

FOREIGN PATENT DOCUMENTS

JP    2002-260658 A    9/2002
JP    2004-47404 A     2/2004
(Continued)

OTHER PUBLICATIONS

International Search Report dated Apr. 8, 2014 in PCT/JP2014/057155 (with English translation).
(Continued)

*Primary Examiner* — Stewart A Fraser
(74) *Attorney, Agent, or Firm* — Oblon, McClelland, Maier & Neustadt, L.L.P.

(57) ABSTRACT

The active material for a nonaqueous electrolyte secondary battery of the present embodiment includes a core particle and a carbon layer. The core particle is formed of silicon particles having a twinned crystal in part of a surface. The carbon layer coats the core particle.

10 Claims, 10 Drawing Sheets

(51) Int. Cl.
- *H01M 4/134* (2010.01)
- *H01M 4/1395* (2010.01)
- *H01M 4/38* (2006.01)
- *H01M 10/052* (2010.01)
- *H01M 4/62* (2006.01)
- *H01M 10/0525* (2010.01)
- *H01M 4/04* (2006.01)

(52) U.S. Cl.
CPC ......... *H01M 4/1395* (2013.01); *H01M 4/386* (2013.01); *H01M 4/625* (2013.01); *H01M 10/052* (2013.01); *H01M 10/0525* (2013.01); *H01M 4/0471* (2013.01); *H01M 2220/30* (2013.01)

(56) References Cited

U.S. PATENT DOCUMENTS

| | | |
|---|---|---|
| 2007/0264574 A1 | 11/2007 | Kim et al. |
| 2011/0159368 A1* | 6/2011 | Hirose ............... H01M 4/134 429/219 |
| 2012/0070738 A1 | 3/2012 | Yoshida |
| 2013/0157127 A1* | 6/2013 | Hirose ............... B60L 3/0046 429/211 |
| 2014/0234722 A1 | 8/2014 | Kyotani et al. |
| 2014/0349187 A1* | 11/2014 | Hirose ............... H01M 4/386 429/221 |

FOREIGN PATENT DOCUMENTS

| | | |
|---|---|---|
| JP | 2007-305569 A | 11/2007 |
| JP | 2008-282819 A | 11/2008 |
| JP | 2012-87043 A | 5/2012 |
| WO | WO 2013/031993 A1 | 3/2013 |

OTHER PUBLICATIONS

Xiao Hua Liu, et al., "Size-Dependent Fracture of Silicon Nanoparticles During Lithiation", ACS Nano, vol. 6, No. 2, 2012, pp. 1522-1531.

* cited by examiner

ACTIVE MATERIAL, ELECTRODE, NONAQUEOUS ELECTROLYTE SECONDARY BATTERY, BATTERY PACK AND PRODUCTION METHOD OF ACTIVE MATERIAL

FIELD

Embodiments described herein relate generally to an active material for a nonaqueous electrolyte secondary battery, an electrode for a nonaqueous electrolyte secondary battery, a nonaqueous electrolyte secondary battery, a battery pack and a production method of an active material for a nonaqueous electrolyte secondary battery.

BACKGROUND

In recent years, because of the popularization of a small-sized portable terminal represented by a smartphone or a tablet computer, there is an increasing demand for a small-sized battery which is capable of operating these and has a higher energy density.

In general, for example, a graphite-based material is used for a negative electrode of a lithium ion battery. The theoretical capacity of a general graphite-based material is 372 mAh/g ($LiC_6$), and the capacity of a lithium ion battery has been currently approaching this limit. Therefore, it is necessary to select a new negative electrode material which further improves the energy density of a lithium ion battery.

As a new negative electrode material, a silicon-based material and tin-based material are attracting attention. These materials have a low potential and a large specific capacity. Also, these materials can be alloyed with lithium, and thus, are preferable as a negative electrode material. Among these materials, a silicon particle can insert lithium up to 4.4 lithium atoms with respect to 1 silicon atom in a ratio, and can theoretically have 10 times the capacity of a graphite-based carbon material.

However, when a silicon particle inserts lithium atoms, the volume expands by about 3 to 4 times. For this reason, in the battery obtained by using a silicon particle as a negative electrode material, the repetition of charge and discharge cracks and pulverizes a silicon particle, and affects the other members constituting the electrodes, and thus, sufficient cycle characteristics may not be obtained. In terms of suppressing the pulverization of a silicon particle, it is effective to reduce the particle size of a silicon particle to 150 nm or less and to decrease the effect based on the volume expansion. However, fine silicon particles are easily aggregated to each other. Therefore, the measures such as the coating of the periphery of a silicon particle with a carbon layer to prevent the aggregation have been proposed.

Also, in the battery obtained by using a silicon-based active material as a negative electrode, the first-time charge and discharge efficiency may not be sufficiently obtained. This is because the 100% lithium, which has been inserted in a silicon-based active material of a negative electrode at the first-time charge, is not returned to a positive electrode at discharge, which is a so-called irreversible capacity. The presence of an irreversible capacity of a negative electrode may result in the decrease in energy density when a battery is produced by combining a negative electrode and a positive electrode. This is because the lithium for an irreversible capacity of a negative electrode should be preliminarily prepared in a positive electrode in order to achieve a battery having high capacity, which results in the decrease in energy density. Therefore, in the battery obtained by using a silicon-based active material as a negative electrode, the improvement of the first-time charge and discharge efficiency is indispensable in order to improve the energy density.

DETAILED DESCRIPTION

The active material for a nonaqueous electrolyte secondary battery of the present embodiment includes a core particle and a carbon layer. The core particle is formed of silicon particles having a twinned crystal in part of a surface. The carbon layer coats the core particle.

Hereinafter, the active material for a nonaqueous electrolyte secondary battery, the electrode for a nonaqueous electrolyte secondary battery, the nonaqueous electrolyte secondary battery, and the battery pack of the embodiments are described with reference to drawings.

(First Embodiment)

Figure 1:
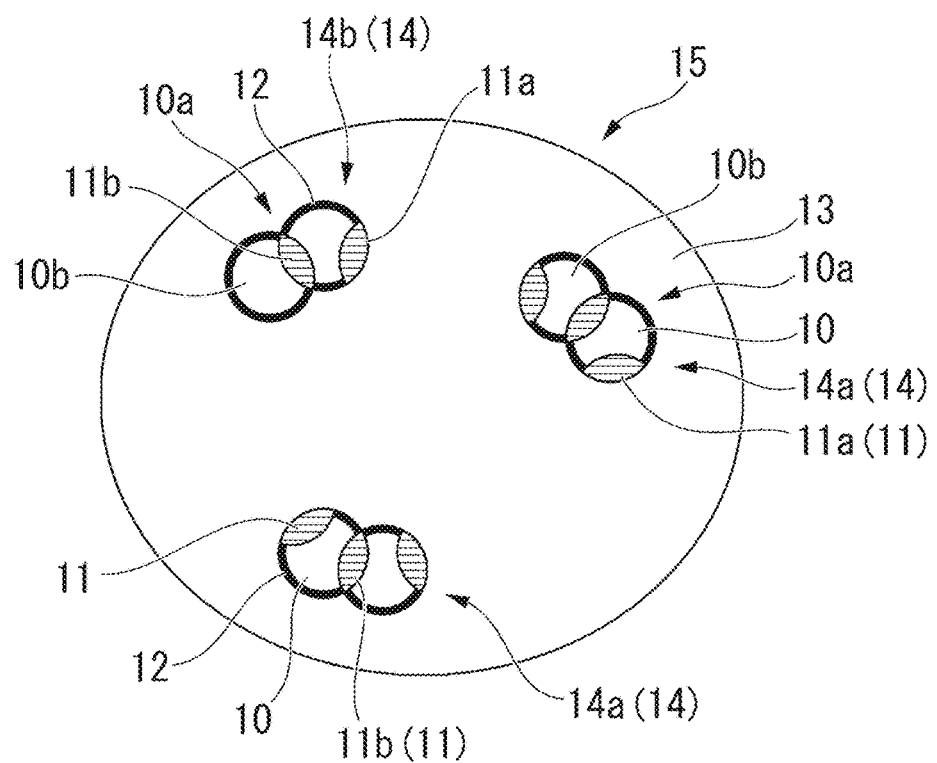
FIG. 1 is a schematic cross-sectional view illustrating the active material for a nonaqueous electrolyte secondary battery of the 1st embodiment.

FIG. 1 is the schematic cross-sectional view illustrating the active material for a nonaqueous electrolyte secondary battery of the 1st embodiment. The active material 15 for a nonaqueous electrolyte secondary battery of the 1st embodiment (hereinafter may be abbreviated as an "active material") is used as an active material for a negative electrode. The active material 15 includes the core particles 14 and the carbon layer 13. The core particles 14 are formed of the silicon particles 10 having the twinned crystal 11 in the part of the surface. The carbon layer 13 coats the core particles 14. The active material 15 shown in FIG. 1 includes the silicon compound layer 12 in the part of the space between the silicon particle 10 and the carbon layer 13.

The active material 15 shown in FIG. 1 contains the 3 core particles 14. Each of the 3 core particles 14 has the silicon particle group 10a formed by bonding the plural silicon particles 10 (the 2 silicon particles in FIG. 1). The silicon particle 10 can contain trace elements such as phosphorus and boron in the middle 10b.

The particle size of the silicon particle 10 contained in the active material 15 shown in FIG. 1 is preferably within a range of 10 nm or more and 150 nm or less. When the particle size of the silicon particle 10 is 10 nm or more, the safety of the production is improved.

Also, when the particle size of the silicon particle 10 is 10 nm or more, the surface area of the silicon particle 10 in the active material 15 is relatively small, and thus, as described below, it is possible to obtain the excellent battery characteristics in the nonaqueous electrolyte secondary battery produced by using the active material 15. As described below, the silicon compound layer 12 may cause the deterioration of the characteristics in the nonaqueous electrolyte secondary battery produced by using the active material 15. As shown in FIG. 1, the silicon compound layer 12 is formed between the silicon particles 10 and the carbon layer 13. For this reason, when the surface area of the silicon particle 10 is relatively decreased, the area of the silicon compound layer 12 formed in the active material 15 is suppressed. As a result, it is possible to obtain the excellent battery characteristics in the nonaqueous electrolyte secondary battery produced by using the active material 15. The particle size of the silicon particle 10 is more preferably 15 nm or more in order to suppress the area of the silicon compound layer 12 in the active material 15.

Also, when the particle size of the silicon particle 10 is 150 nm or less, it is possible to decrease the influence of the volume change of the silicon particle 10 caused by charge and discharge in the nonaqueous electrolyte secondary battery (for example, a lithium secondary battery) produced by using the active material 15, and it is possible to prevent the collapse of the active material 15. In order to more effectively prevent the collapse of the active material 15, the particle size of the silicon particle 10 is more preferably 100 nm or less. The particle size of the silicon particle 10 is much more preferably 60 nm or less. The silicon particles 10 contained in the active material 15 may be partially grown.

The particle size of the silicon particle is defined as follows. The plural active materials were observed by a transmission electron microscope (TEM) at a magnification of 200,000 times or more, and at least 10 silicon particles that are located on the diagonal of the field of view are selected. Then, the major axes and the minor axes are measured while removing the largest silicon particle and the smallest silicon particle, and the average value thereof is defined as the particle size of the silicon particles.

As shown in FIG. 1, the twinned crystal 11 is formed at the part of the surface of the silicon particle 10. The twinned crystal 11 includes the external twinned crystal 11a having contact with the carbon layer 13 and the internal twinned crystal 11b having no contact with the carbon layer 13. The internal twinned crystal 11b is formed between the adjacent silicon particles 10 bonded to each other. The external twinned crystal 11a is formed at a position apart from the internal twinned crystal 11b in the surface of the silicon particle 10.

In the active material 15 shown in FIG. 1, the 1 core particle 14b of the 3 core particles 14 is comprised of the silicon particle 10 having the external twinned crystal 11a and the silicon particle 10 having no external twinned crystal 11a. The 2 core particle 14a of the 3 core particles 14 are comprised of the 2 silicon particles 10 having the external twinned crystal 11a. The active material 15 shown in FIG. 1 includes the core particle 14 containing the external twin crystal 11a having contact with the carbon layer 13, and thus, the resistance is small as compared with the case of the absence of the external twin crystal 11a. For this reason, the nonaqueous electrolyte secondary battery produced by using the active material 15 has a high capacity.

The active material 15 shown in FIG. 1 includes the silicon compound layer 12 in the part of the space between the silicon particle 10 and the carbon layer 13. As shown in FIG. 1, the silicon compound layer 12 is formed to coat the part of the surface of the silicon particle 10 in which the twinned crystal 11 is not formed.

Examples of the silicon compound layer 12 include layers containing at least one silicon compound having silicon, and oxygen and/or carbon. Specific examples of the silicon compound include a compound composed of silicon and oxygen, and a compound composed of silicon, oxygen and carbon. It is preferable that the silicon compound layer 12 contain a carbon-containing silicon compound. A carbon-containing silicon compound is excellent in electroconductivity as compared with a carbon-free silicon compound, and thus, it is possible to obtain excellent properties in the nonaqueous electrolyte secondary battery produced by using the active material 15.

The thickness of the silicon compound layer 12 is preferably within a range of 1 nm or more and 10 nm or less. When the thickness of the silicon compound layer 12 is 1 nm or more, it is possible to efficiently suppress the volume expansion of the active material 15 caused by the insertion of an ion (for example, lithium) in the nonaqueous electrolyte secondary battery produced by using the active material 15. In order to more efficiently suppress the volume expansion of the active material 15, it is more preferable to set the thickness of the silicon compound layer 12 to 2 nm or more. Also, when the thickness of the silicon compound layer 12 is 10 nm or less, it is possible to suppress that the silicon compound layer 12 prevents the ion and electron conductivities between the silicon particle 10 and the carbon layer 13. For this reason, it is possible to obtain an excellent battery property in the nonaqueous electrolyte secondary battery produced by using the active material 15. In order to more efficiently improve the ion and electron conductivities between the silicon particle 10 and the carbon layer 13, it is more preferable to set the thickness of the silicon compound layer 12 to 5 nm or less.

In the active material 15 shown in FIG. 1, the whole surface of the core particle 14 is coated with the carbon layer 13. It is preferable that the carbon layer 13 contain a material used as an electroconductive auxiliary agent. Examples of a material used as an electroconductive auxiliary agent include graphite, a carbon nanofiber, a carbon nanotube and acetylene black. The carbon layer 13 can enclose a fine pore having a size of about 10 nm to about 10 μm.

The active material 15 shown in FIG. 1 include the core particles 14 which are formed of the silicon particles 10 having the twinned crystal 11 in part of the surface. This core particle 14 has a large storage amount of lithium and excellent crystallinity. For this reason, it is possible to improve the initial capacity and the initial efficiency in the nonaqueous electrolyte secondary battery produced by using the active material 15

Also, the active material 15 shown in FIG. 1 include the carbon layer 13 which coats the core particles 14. Thus, the active material 15 has electroconductivity. Also, when a nonaqueous electrolyte secondary battery is produced by using the active material 15, the volume expansion caused by the insertion of an ion such as lithium is suppressed by the carbon layer 13. Accordingly, it is possible to prevent the separation and missing of the active material 15 from the current collector in the electrode produced by using the active material 15, and it is possible to provide the nonaqueous electrolyte secondary battery excellent in cycle characteristics.

The active material 15 shown in FIG. 1 includes, as the core particle 14, the silicon particle group 10a formed by bonding the plural silicon particles 10. In the silicon particles group 10a, the part at which the silicon particles 10 are bonded to each other corresponds to the region in which the silicon particles 10 do not have contact with the carbon layer 13.

Accordingly, the silicon compound layer 12, which causes the deterioration of the battery characteristics, is not formed at the part where the silicon particles 10 are bonded to each other. For this reason, when the core particle 14 has the silicon particle group 10a, the area of the silicon compound layer 12 formed in the active material 15 is suppressed. Consequently, it is possible to improve the initial capacity and the initial efficiency in the nonaqueous electrolyte secondary battery produced by using the active material 15 when the core particle 14 has the silicon particle group 10a, for example, as compared with the case that the core particle has the single independent silicon particle.

The active material 15 shown in FIG. 1 includes the silicon compound layer 12 in part of the space between the silicon particle 10 and the carbon layer 13. When a nonaqueous electrolyte secondary battery is produced by using the active material 15, the volume change of the silicon particle 10 caused by charge and discharge can be reduced by the silicon compound layer 12, and it is possible to obtain the much excellent cycle characteristics.

Figure 2:
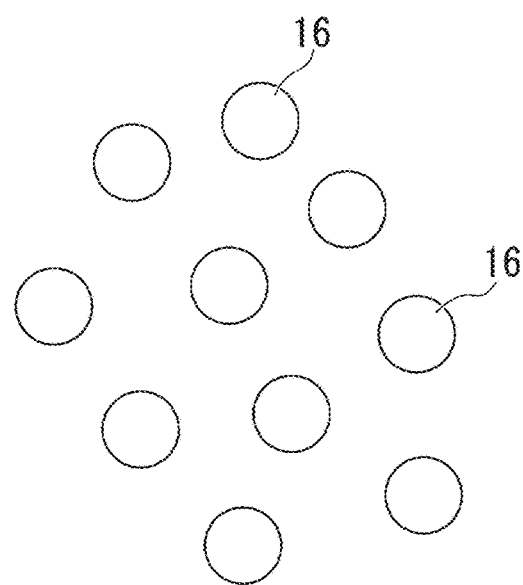
FIG. 2 is a process chart illustrating an example of the production method of the active material illustrated in FIG. 1.

Next, the production method of the active material 15 illustrated in FIG. 1 is described with reference to FIG. 2 to FIG. 5. FIG. 2 to FIG. 5 are the process charts illustrating an example of the production method of the active material. In order to produce the active material 15 illustrated in FIG. 1, firstly, the silicon microparticles 16 that form the silicon particles 10 are prepared as shown in FIG. 2. This silicon microparticle 16 may be a primary particle or a secondary particle formed by aggregating primary particles.

The particle size of the silicon microparticle is defined as follows. The plural silicon microparticles were observed by a transmission electron microscope (TEM) at a magnification of 200,000 times or more, and at least 10 silicon microparticles that are located on the diagonal of the field of view are selected. Then, the major axes and the minor axes are measured while removing the largest silicon particle and the smallest silicon particle, and the average value thereof is defined as the particle size of the silicon microparticles.

Figure 3:
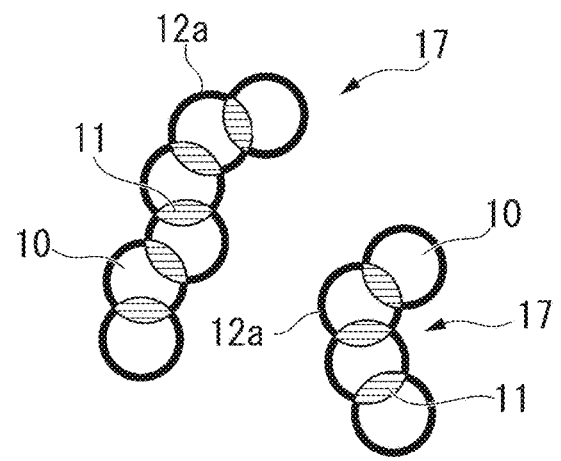
FIG. 3 is a process chart illustrating an example of the production method of the active material illustrated in FIG. 1.

Next, the silicon microparticles 16 are subjected to the thermal treatment at a temperature of 1000° C. to 1300° C. (the pretreatment step). Through this step, the twinned crystal 11 is formed between the adjacent silicon microparticles 16, and the plural silicon microparticles 16 are bonded by the twinned crystal 11. When the silicon microparticles 16 forms the particle group in which the silicon microparticles have been already bonded, the twinned crystal 11 is formed between the adjacent silicon microparticles 16, and the bonding structure thereof becomes more stable. As a result, the silicon-sintered body 17, in which the plural silicon particles 10 having the twinned crystals 11 in the part of the surface (the boundary surface between the bonded particles) are bonded, is formed as shown in FIG. 3. The twinned crystal 11 is formed when the crystal of the heated silicon microparticle 16 forms the crystal structure symmetrical about a certain plane or axis together with the adjacent silicon microparticle 16 in order to be a more stable state. The number of the silicon microparticle 16 contained in the silicon-sintered body 17 obtained by the pretreatment step is not particularly limited. As an example of the silicon-sintered body 17, FIG. 3 illustrates the sintered body formed by bonding 6 pieces of silicon particle 10 and the sintered body formed by bonding 4 pieces of silicon particle.

Also, as shown in FIG. 3, by carrying out the pretreatment step, the coating layer 12a is formed on the surface of the silicon-sintered body 17 so as to cover the whole silicon-sintered body 17, In the pretreatment step, the thermal treatment temperature is 1000° C. or more, and thus, some of the silicon microparticles 16 are sintered to form the twinned crystal 11. Also, the plural silicon particles 10 having the twinned crystal 11 in part of the surface are bonded, and the coating layer 12a is formed on the surface, to thereby obtain the silicon-sintered body 17. In order to obtain the silicon particle 10 having better crystallinity, the thermal treatment temperature in the pretreatment is preferably 1050° C. or more.

In the pretreatment step, the thermal treatment temperature is 1300° C. or less, and thus, it is possible to prevent that the sintering of the silicon microparticle 16 excessively progresses to thereby coarsen the silicon-sintered body 17. The silicon-sintered body 17 obtained by carrying out the pretreatment step can be easily pulverized at the twinned crystal 11 which becomes the starting point. However, when the silicon-sintered body 17 is coarsened, a step of pulverizing the silicon-sintered body 17 should be added before the complexing step described below, and productivity deteriorates. In order to suppress the coarsening of the silicon-sintered body 17, the thermal treatment temperature is preferably 1200° C. or less.

In the pretreatment step, the thermal treatment time is preferably within a range of 1 minute to 10 hours. When the thermal treatment time is 1 minute or more, the sintering of the silicon microparticle 16 sufficiently progresses, the twinned crystal 11 is sufficiently formed between the adjacent silicon microparticles 16, and the coating layer 12a is sufficiently formed on the surface of the silicon-sintered body 17. Also, when the thermal treatment time is 10 hours or less in the pretreatment step, it is possible to prevent that the sintering of the silicon microparticle 16 excessively progresses and that the silicon-sintered body 17 is coarsened. Also, when the thermal treatment time is 10 hours or less in the pretreatment step, the productivity of the active material 15 is improved.

It is preferable that the thermal treatment in the pretreatment step be carried out in a non-oxidizing atmosphere because it is possible to prevent that, in the pretreatment step, the silicon microparticle 16 and an atmosphere gas are reacted on the surface of the silicon-sintered body 17, to thereby produce the silicon compound such as a silicon oxide. As a non-oxidizing atmosphere, an inert atmosphere such as an Ar atmosphere is exemplified.

Next, the silicon-sintered body 17 is mixed with the carbon material, and the silicon-sintered body 17 is crashed to obtain the crushed particles 24, to thereby form the slurry containing the crushed particles 24 and the carbon material (the slurry formation step).

Figure 4:
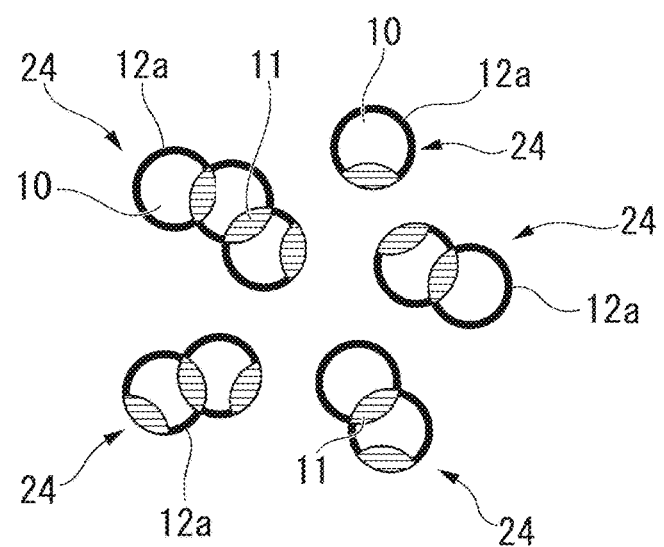
FIG. 4 is a process chart illustrating an example of the production method of the active material illustrated in FIG. 1.

As shown in FIG. 4, the silicon-sintered body 17 is crashed in the slurry formation step to obtain the crushed particles 24 having a preferable size as the core particle 14 shown in FIG. 1. When the silicon-sintered body 17 is crashed, the fragile twinned crystal 11 becomes the starting point for the crash, and thus, the twinned crystal 11 is exposed on the surface.

Examples of the carbon material used to form the slurry include graphite, coke, low-temperature firing charcoal and pitch. The carbon material can be used singly or as a mixture of plural materials. For example, in the case where a material that is easily melted such as pitch is used as the carbon material, this carbon material is melted when being mixed with the silicon-sintered body 17, and the complexing of the silicon-sintered body 17 and the carbon material may hardly progress. Therefore, in the case where a material that is easily melted is used as the carbon material, it is preferable to mix this with a material that is hardly melted such as coke, graphite or the like.

It is preferable that the carbon material used to form the slurry contain a material used as the electroconductive auxiliary agent described above.

Also, the carbon material used to form the slurry may contain a carbon precursor. As a carbon precursor, it is preferable to use a liquid material or a dispersion medium-soluble material in the step of forming the slurry in order to achieve the uniform mixing with the silicon-sintered body 17. Examples of the above carbon precursor include organic materials such as a furan resin, a xylene resin, a ketone resin, an amino resin, a melamine resin, a urea resin, an aniline resin, a urethane resin, a polyimide resin, a polyester resin, a phenol resin, a resole resin, polyvinyl alcohol and sucrose.

When mixing the silicon-sintered body 17 and the carbon material, it is preferable that a liquid phase mixing using a dispersion medium be carried out in order to obtain the slurry in which these materials are uniformly mixed. As the dispersion medium, it is possible to use an organic solvent, water or the like, and it is preferable to use a medium having a good affinity for the silicon-sintered body 17 and the carbon material. Specifically, as the dispersion medium, it is preferable to use ethanol, acetone, isopropyl alcohol, methyl ethyl ketone, ethyl acetate, N-methylpyrrolidone (NMP) or the like.

As a device used for the formation of the slurry, it is preferable to use a device which is capable of mixing the silicon-sintered body 17 and the carbon material and crashing the silicon-sintered body 17. Specifically, it is possible to use a mixing and stirring device such as a ball mill or a bead mill. The device used for the formation of the slurry can be used singly or in combination of plural devices.

Figure 5:
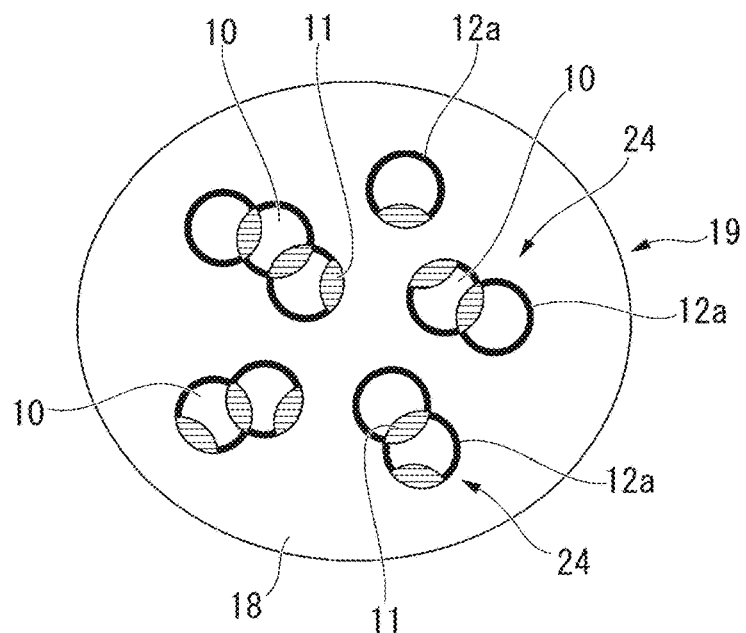
FIG. 5 is a process chart illustrating an example of the production method of the active material illustrated in FIG. 1.

Next, the slurry obtained in this manner is cured or dried, and then is fired, to thereby form the complex 19 of the crushed particles 24 and the carbon precursor 18 as shown in FIG. 5 (the complexing step). The firing temperature and the firing time for the slurry in the complexing step are not particularly limited, but the temperature of 800° C. to 1200° C. and the time of 10 minutes to 10 hours are preferable.

The complex 19 obtained in this manner is pulverized by using various mills, a pulverizing device, a grinder, or the like as needed, to thereby adjust the particle size, the specific surface area, and the like.

The production method of the complex 19 is not limited to the above-described method, and for example, it is possible to use the method in which the slurry is granulated by a method such as spray drying, and then is fired.

Regarding the size of the complex 19, when carrying out a measurement using a particle size distribution meter, D50 is preferably within a range of 0.5 to 20 µm, and the specific surface area is preferably within a range of 5 to 30 m$^2$/g.

Next, the complex 19 is fired for 10 minutes to 12 hours at a temperature of 700° C. to 1200° C. (the firing step). Through this step, it is possible to form the carbon layer 13 which coats the core particle 14 and to obtain the active material 15.

The thermal treatment temperature and the thermal treatment time are decided within the aforementioned ranges according to the type of the carbon precursor 18 forming the complex 19 (the type of the carbon material in the slurry), the hardness required as the carbon layer 13, and the like.

In the firing step, the carbon precursor 18 and the surfaces of the crushed particles 24 shown in FIG. 5 are reacted to produce the silicon compound, and then, the silicon compound layer 12 is formed on the coating layer 12a of the surface of the crushed particles 24. The silicon compound layer 12 is easily formed on the coating layer 12a having the lower crystallinity than the twinned crystal 11 of the surface of the core particle 14. For this reason, as shown in FIG. 1, the silicon compound layer 12 is formed to cover the part of the surface of the silicon particle 10 where the twinned crystal 11 is not formed. Accordingly, as shown in FIG. 1, the carbon layer 13 is formed in contact with the twinned crystal 11 at the part where the twinned crystal 11 is exposed on the surface of the core particle 14.

The silicon compound contained in the silicon compound layer 12 contains the silicon compound produced by the reaction of the crushed particles 24 and the carbon precursor 18 in the firing step. Accordingly, the silicon compound contained in the silicon compound layer 12 varies depending on the material of the carbon precursor 18. For example, when an oxygen-containing carbon material such as a resol resin is used as the carbon precursor 18, the carbon and oxygen in the carbon precursor 18 are reacted with the surface of the crushed particle 24 in the firing step, to thereby form the silicon compound layer 12 containing silicon and the silicon compound having oxygen and/or carbon.

In the firing step, the thermal treatment temperature is 10 minutes or more, and thermal treatment temperature is 700° C. or more, and thus, the sintering of the carbon layer 13 can progress sufficiently. In order to improve the hardness of the carbon layer 13 after the sintering step and to further improve the cycle characteristics of the nonaqueous electrolyte secondary battery obtained by using this carbon layer, in the firing step, the thermal treatment temperature is preferably 10 minutes or more, and thermal treatment temperature is preferably 1050° C. or more.

Also, in the firing step, the thermal treatment temperature is 12 hours or less, and thermal treatment temperature is 1200° C. or less, and thus, it is possible to suppress that the silicon compound layer 12 is produced more than necessary on the surface of the silicon particle 10. Thus, when a nonaqueous electrolyte secondary battery (for example, a lithium secondary battery) is produced by using the active material 15, the deterioration of the characteristics caused by the silicon compound layer 12 hardly occurs.

Examples of the atmosphere, in which the thermal treatment is carried out in the firing step, include a hydrogen-containing Ar atmosphere and an inert atmosphere such as an Ar atmosphere. When the atmosphere, in which the thermal treatment is carried out in the firing step, is an inert atmosphere, it is possible to prevent that the silicon compound that forms the silicon compound layer 12 is excessively formed by the reaction of the crushed particles 24 and the atmosphere gas.

Regarding the active material 15 that is the product of the firing step, the particle size, the specific surface area, and the like may be adjusted by using various mills, a pulverizing device, a grinder, or the like as needed.

Through the above steps, it is possible to obtain the active material 15 shown in FIG. 1.

In the production method of the active material 15 of the present embodiment, by carrying out the pretreatment step, it is possible to obtain the silicon particle 10, the surface of which is coated with the twinned crystal 11 having the higher crystallinity than the silicon microparticle 16 and the substantially amorphous coating layer 12a as shown in FIG. 3. For this reason, the reaction of the carbon precursor 18 and the surface of the silicon particles 10 hardly occur in the firing step, for example, as compared with the case that the complex of the silicon microparticles 16 and the carbon material is formed and fired. Accordingly, when the pretreatment step has been carried out, an excess amount of the silicon compound layer 12 is hardly produced on the surface of the silicon particle 10 even when the firing step is carried out. As a result, the thermal treatment temperature in the firing step can be increased as compared with the case that the pretreatment step has not been carried out.

When the pretreatment step is not carried out, in the firing step, the silicon particle and the carbon material existing around this are easily reacted to form the silicon compound layer on the surface. When the surface of the silicon particle is covered with the thick silicon compound layer, it is not possible to obtain the good characteristics in the nonaqueous electrolyte secondary battery obtained by using the obtained active material. Therefore, when the pretreatment step is not carried out, it is necessary to set the thermal treatment temperature in the firing step to less than 1050° C., to thereby prevent that the silicon compound layer is formed on the surface of the silicon particle. For this reason, when the pretreatment step was not carried out, it was not possible to set the thermal treatment temperature in the firing step to 1050° C. or more.

In the production method of the active material 15 of the present embodiment, the thermal treatment temperature in the firing step can be set to a range of 1050° C. to 1200° C. Thus, the sintering of the carbon layer 13 can progress sufficiently, and it is possible to obtain the hard carbon layer 13. For this reason, when a nonaqueous electrolyte secondary battery is produced by using the active material 15, it is possible to effectively suppress the volume expansion caused by the insertion of an ion such as lithium, and to obtain the excellent cycle characteristics.

Figure 6:
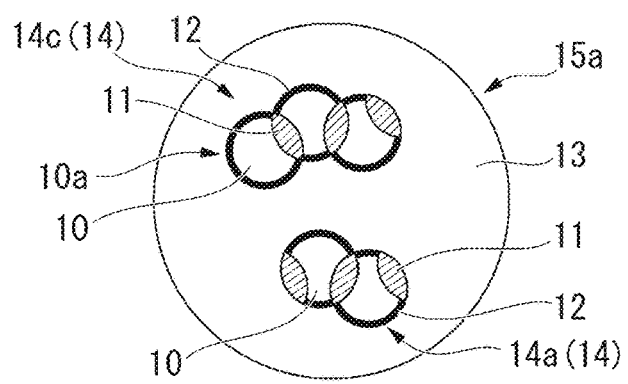
FIG. 6 is a schematic cross-sectional view illustrating another example of the active material.

In the above embodiment, as shown in FIG. 1, the active material 15 includes the 3 core particles 14 comprised of the silicon particles group 10a, but the number of the core particle 14 is not particularly limited. For example, as shown in FIG. 6, the active material 15a can include the 2 core particles 14, and as shown in FIG. 7, the active material 15b can include the 1 core particle 14.

The number of the silicon particle 10 contained in the silicon particle group 10a is not particularly limited. For example, the silicon particle group 10a can be formed by bonding the 3 silicon particles 10 in the same manner as the core particle 14c of the active material 15a shown in FIG. 6.

Figure 7:
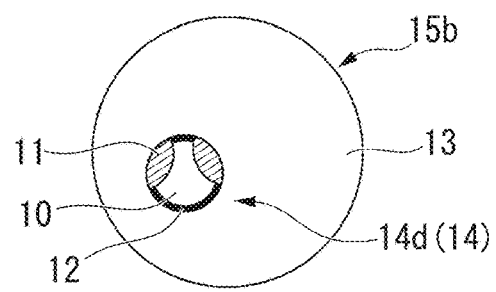
FIG. 7 is a schematic cross-sectional view illustrating another example of the active material.

Also, for example, the core particle 14 can be the single independent silicon particle 10 in the same manner as the core particle 14d of the active material 15b shown in FIG. 7.

As shown in FIG. 1, the above embodiment is described by exemplifying the active material in which the silicon compound layer 12 is formed to coat the part of the surface of the silicon particle 10 in which the twinned crystal 11 is not formed. However, the silicon compound layer 12 can be formed at part or whole of the part of the surface of the silicon particle 10 in which the twinned crystal 11 (exterior twinned crystal 11a) is formed. In other words, the silicon compound layer 12 can be formed in part or whole of the space between the twinned crystal 11 and the carbon layer 13.

This active material can be formed by reacting the twinned crystal exposed on the surface of the crushed particle, and the carbon and oxygen in the carbon precursor.

In the above embodiment, as shown in FIG. 1, the whole surface of the core particle 14 of the active material 15 is coated with the carbon layer 13, but part of the surface of the core particle 14 can be exposed to the outside of the carbon layer 13.

The ratio (Si/C) of the silicon particle 10 and the carbon layer 13 in the active material 15 is preferably within a range of 0.5 to 2.5 in mass ratio. When Si/C is 0.5 or more, it is easy to obtain the nonaqueous electrolyte secondary battery having high capacity. When Si/C is 2.5 or less, the carbon content sufficiently increases in the carbon layer 13 that coats the silicon particle 10, and it is possible to prevent that the silicon particle 10 is exposed without being coated with the carbon layer 13. When the carbon content in the active material 15 is insufficient, the silicon particle 10 is exposed and has contact with the electrolyte solution, which can cause the electrochemical decomposition of the electrolyte solution. As a result, a film can be formed, and the first-time charge and discharge efficiency can decrease.

Herein, the active material 15 of the present embodiment is preferable as a negative electrode active material, but can be employed as a positive electrode active material by considering the potential.

(Second Embodiment)

Next, the nonaqueous electrolyte secondary battery according to the 2nd embodiment is described.

The nonaqueous electrolyte secondary battery of the present embodiment include at least a positive electrode, the negative electrode including the active material obtained by the production method according to the 1st embodiment, and a nonaqueous electrolyte. More specifically, the nonaqueous electrolyte secondary battery according to the present embodiment includes an exterior member, a positive electrode that is housed in the exterior member, the negative electrode, which is spatially separated from the positive electrode, is housed in the exterior member containing a separator interposed therebetween, and includes the above active material, and a nonaqueous electrolyte charged in the exterior member.

Figure 8:
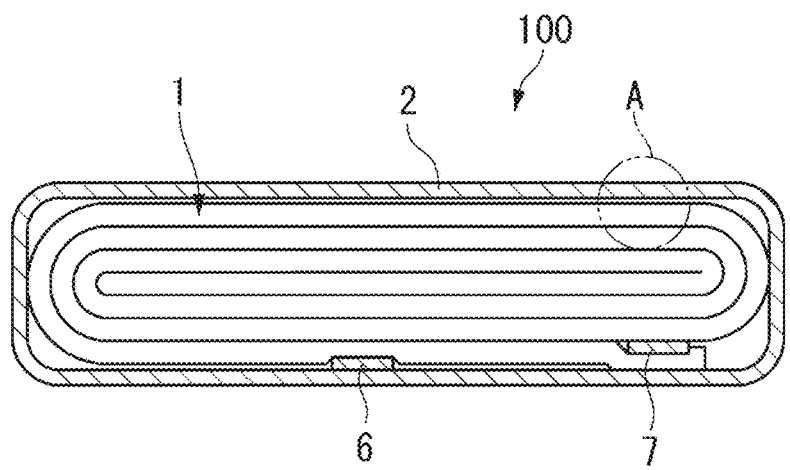
FIG. 8 is a schematic cross-sectional view illustrating an example of the nonaqueous electrolyte secondary battery according to 2nd embodiment.
Figure 9:
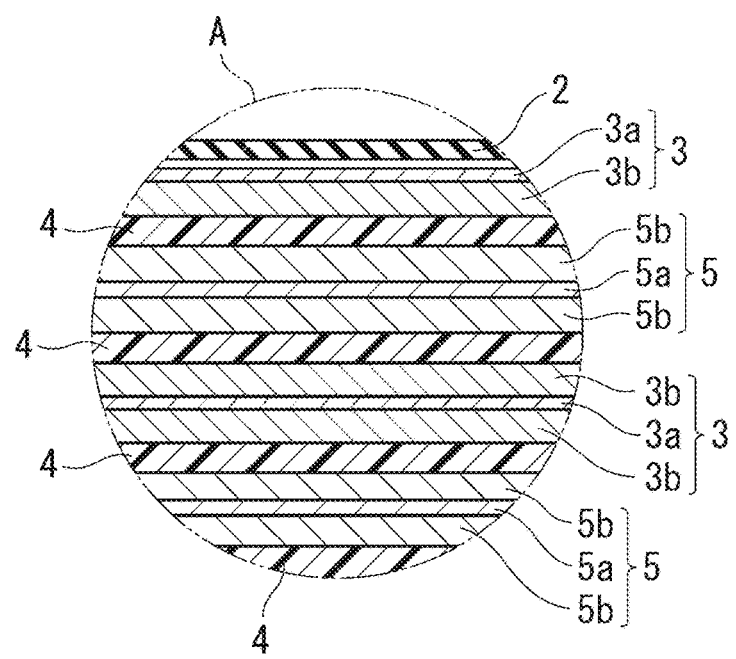
FIG. 9 is an enlarged cross-sectional view of the part A illustrated in FIG. 8.

Hereinafter, the nonaqueous electrolyte secondary battery 100 illustrated in FIG. 8 and FIG. 9 is described as an example of the nonaqueous electrolyte secondary battery according to the present embodiment. FIG. 8 is a schematic cross-sectional view of the nonaqueous electrolyte secondary battery 100. FIG. 9 is an enlarged cross-sectional view of the part A illustrated in FIG. 8. These drawings are schematic diagrams for describing the nonaqueous electrolyte secondary battery according to the embodiment. The shapes, dimensions, ratios, and the like are different from those of actual device at some parts, but design of the shape, dimensions, ratios, and the like can be appropriately modified in consideration of the following description and known technologies.

The nonaqueous electrolyte secondary battery 100 illustrated in FIG. 8 is configured such that the winding electrode group 1 having a flat shape is housed in the exterior member 2. The exterior member 2 may be a container obtained by forming a laminate film in a bag-like shape, or may be a metal container. As illustrated in FIG. 9, the winding electrode group 1 having a flat shape is formed by spirally winding the laminated product obtained by laminating the negative electrode 3, the separator 4, the positive electrode 5 and the separator 4 from the outside, i.e. the side of the exterior member 2, in this order, followed by performing press-molding. As illustrated in FIG. 9, the negative electrode 3 located at the outermost periphery has the configuration in which the negative electrode layer 3*b* is formed on one surface of the negative electrode current collector 3*a* on the inner surface side. The negative electrodes 3 at the parts other than the outermost periphery have the configuration in which the negative electrode layers 3*b* are formed on both surfaces of the negative current collector 3*a*. Then, in the nonaqueous electrolyte secondary battery 100 according to the present embodiment, the negative electrode active material in the negative electrode layer 3*b* has been configured to include the active material according to the 1st embodiment. Also, the positive electrode 5 has the configuration in which the positive electrode layers 5*b* are formed on both surfaces of the positive current collector 5*a*. Herein, the gel-like nonaqueous electrolyte described below can be used instead of the separator 4.

In the vicinity of the outer peripheral end of the winding electrode group 1 illustrated in FIG. 8, the negative electrode terminal 6 is electrically connected to the negative current collector 3*a* of the negative electrode 3 of the outermost periphery. The positive electrode terminal 7 is electrically connected to the positive current collector 5*a* of the inner positive electrode 5. The negative electrode terminal 6 and the positive electrode terminal 7 extend toward the outside of the exterior member 2, or are connected to the extraction electrodes included in the exterior member 2.

When manufacturing the nonaqueous electrolyte secondary battery 100 including the exterior member formed of the laminate film, the winding electrode group 1, to which the negative electrode terminal 6 and the positive electrode terminal 7 are connected, is charged in the exterior member 2 having a bag-like shape with an opening. Subsequently, the liquid nonaqueous electrolyte is injected from the opening of the exterior member 2. Then, the opening of the exterior member 2 having a bag-like shape is subjected to heat-sealing in the state of sandwiching the negative electrode terminal 6 and the positive electrode terminal 7 therebetween, to thereby completely sealing the winding electrode group 1 and the liquid nonaqueous electrolyte.

Also, when manufacturing the nonaqueous electrolyte battery 100 having the exterior member formed of the metal container, the winding electrode group 1 to which the negative electrode terminal 6 and the positive electrode terminal 7 are connected is charged in the metal container having an opening. Subsequently, the liquid nonaqueous electrolyte is injected from the opening of the exterior member 2, and the opening is sealed by mounting a cover member on the metal container.

For the negative electrode terminal 6, it is possible to use the material having electric stability and electroconductivity within a range of a potential equal to or nobler than 1 V and equal to or lower than 3 V with respect to lithium, for example. Specific examples of this material include aluminum and an aluminum alloy containing an element such as Mg, Ti, Zn, Mn, Fe, Cu or Si. Also, it is more preferable that the negative electrode terminal 6 be formed of the same material as the negative current collector 3*a* in order to reduce the contact resistance with the negative current collector 3*a*.

For the positive electrode terminal 7, it is possible to use the material having electric stability and electroconductivity within a range of 3 to 4.25 V of a potential with respect to lithium. Specific examples of this material include aluminum and an aluminum alloy containing an element such as Mg, Ti, Zn, Mn, Fe, Cu or Si. It is more preferable that the positive electrode terminal 7 be formed of the same material as the positive current collector 5*a* in order to reduce the contact resistance with the positive current collector 5*a*.

Hereinafter, the exterior member 2, the negative electrode 3, the positive electrode 5, the separator 4, and the nonaqueous electrolyte which are constituent members of the nonaqueous electrolyte battery 100 are described in detail.

(1) Exterior Member

As the exterior member 2, it is possible to use a container formed of a laminate film having a thickness of 0.5 mm or less, or a metal container having a wall thickness of 1.0 mm or less.

Examples of the shape of the exterior member 2 include a flat type (thin type), a square type, a cylindrical type, a coin type and a button type, and it is possible to select an appropriate one from these shapes.

Examples of the exterior member 2 include an exterior member for a small battery which is mounted on a portable electronic device or the like and an exterior member for a large battery which is mounted on a two-wheel or four-wheel automobile or the like.

When using the exterior member 2 formed of a laminate film, it is possible to use a multi-layer film in which a metal layer is placed between resin films. In order to reduce a weight, it is preferable to use an aluminum foil or an aluminum alloy foil as the metal layer in the above case. Also, as a resin film, for example, it is possible to use a polymer material such as polypropylene (PP), polyethylene (PE), nylon or polyethylene terephthalate (PET). A laminate film can be molded into a shape of an exterior member through the sealing based on thermal fusion.

When using the exterior member 2 of a metal container, it is possible to use a container formed of aluminum, an aluminum alloy, or the like. This aluminum alloy is preferably an alloy containing an element such as magnesium, zinc or silicon. Also, when a transition metal such as iron, copper, nickel or chromium is contained in the aluminum alloy, it is preferable to suppress the content of a transition metal to 100 ppm by mass or less. Also, when using the exterior member 2 of a metal container, it is more preferable to use a metal container having a wall thickness of 0.5 mm or less.

(2) Negative Electrode

The negative electrode 3 includes the negative electrode current collector 3*a* and the negative electrode layer 3*b* which is formed on one side or both sides of the negative electrode current collector 3*a* and contains a negative electrode active material, an electroconductive agent, and a binder.

As the negative electrode active material, the aforementioned active material according to the 1st embodiment is used. The nonaqueous electrolyte secondary battery 100, which includes the negative electrode 3 provided with the negative electrode 3b containing the above negative electrode active material, is excellent in the first-time charge and discharge efficiency and the cycle characteristics.

As the negative electrode active material, the active material according to the 1st embodiment can be used singly or as a mixture with another negative electrode active material. As another negative electrode active material, it is possible to use anatase type titanium dioxide $TiO_2$, β type titanium dioxide, a ramsdellite type lithium titanate $Li_2Ti_3O_7$ a spinel-type lithium titanate $Li_4Ti_{15}O_2$, niobium oxide, niobium-containing composite oxide, or the like. These negative electrode active materials can be preferably used because these are easily mixed and dispersed with the active material according to the 1st embodiment.

The electroconductive agent improves the electric power collection performance of the negative electrode active material and suppresses contact resistance between the negative electrode active material and the negative electrode current collector 3a. Examples of the electroconductive agent include an agent containing acetylene black, carbon black, coke, a carbon fiber, graphite or the like.

The binder fills spaces between the dispersed negative electrode active materials to thereby bind the negative active material and the electroconductive agent, and bind the negative electrode active material and the negative electrode collector 3a. Examples of the binder include an agent containing polytetrafluoroethylene (PTFE), polyvinylidene fluoride (PVdF), fluorine-based rubber, styrene-butadiene rubber (SBR), an ethylene-propylene-diene copolymer (EPDM), carboxymethyl cellulose (CMC), polyimide, polyaramide, polyacrylic acid or the like.

In the negative electrode layer 3b, the negative electrode active material, the electroconductive agent, and the binder are preferably blended at ratios of 68 mass % or more and 96 mass % or less, 2 mass % or more and 30 mass % or less, and 2 mass % or more and 30 mass % or less, respectively. Also, the negative electrode active material, the electroconductive agent, and the binder are more preferably blended at ratios of 70 mass % or more and 96 mass % or less, 2 mass % or more and 28 mass % or less, and 2 mass % or more and 28 mass % or less, respectively.

By setting the amount of the electroconductive agent to 2 mass % or more, it is possible to improve the electric power collection performance of the negative layer 3b, and to improve the large current characteristics of the nonaqueous secondary electrolyte battery 100.

By setting the amount of the binder to 2 mass % or more, it is possible to improve the binding property of the negative electrode layer 3b and the negative electrode current collector 3a, and to improve the cycle characteristics.

In terms of the increase in capacity, it is preferable to set both amounts of the electroconductive agent and the binder to 28 mass % or less.

The negative electrode current collector 3a is preferably an aluminum foil which is electrochemically stable within a potential range of nobler than 1 V or an aluminum alloy foil containing an element such as Mg, Ti, Zn, Mn, Fe, Cu, or Si. The thickness of the negative electrode collector 3a is preferably within a range of 5 to 25 μm and more preferably within a range of 5 to 20 μm.

In addition to the above foil, a stainless foil, a titanium foil, a copper foil, a nickel foil, or the like can be used as the negative electrode collector 3a. For example, when a negative electrode potential is nobler than 0.3 V with respect to metal lithium or when a lithium-titanium oxide is contained as the negative electrode active material, it is preferable to use the above-described aluminum foil or aluminum alloy foil for the negative electrode collector 3a because it is possible to suppress the battery weight.

When the above aluminum foil is used as the negative electrode current collector 3a, the purity of the aluminum foil is preferably 99% or more.

When the above aluminum alloy foil is used as the negative electrode current collector 3a, it is preferable to suppress a content of a transition metal such as Fe, Cu, Ni or Cr to 1 mass % or less.

The negative electrode 3 can be produced, for example, by suspending the negative electrode active material, the electroconductive agent, and the binder in a general solvent to prepare a slurry, applying the slurry to the negative electrode current collector 3a and performing drying, and then performing pressing.

Also, the negative electrode 3 may be produced by forming the negative electrode active material, the electroconductive agent, and the binder in a pellet form to make the negative electrode layer 3b, and disposing and forming this negative electrode layer on the negative electrode current collector 3a.

(3) Positive Electrode

The positive electrode 5 includes the positive electrode current collector 5a and the positive electrode layer 5b which is formed on one side or both sides of the positive electrode current collector 5a and contains a positive electrode active material, a electroconductive agent, and a binder. As the positive electrode active material, for example, it is possible to use an oxide, a sulfide, a polymer or the like.

As the positive electrode active material, for example, it is possible to use manganese dioxide ($MnO_2$) in which lithium is inserted, an iron oxide, a copper oxide, a nickel oxide, a lithium-manganese composite oxide (for example, $Li_xMn_2O_4$ or $Li_xMnO_2$), a lithium-nickel composite oxide (for example, $Li_xNiO_2$), a lithium-cobalt composite oxide ($Li_xCoO_2$), a lithium-nickel-cobalt composite oxide (for example, $Li_xNi_{1-y}Co_yO_2$), a lithium-manganese-cobalt composite oxide (for example, $Li_xMn_yCo_{1-y}O_2$), a lithium-manganese-nickel composite oxide having a spinel structure ($Li_xMn_{2-y}Ni_yO_4$), a lithium-phosphorus oxide having an olivine structure (for example, $Li_xFePO_4$, $Li_xFe_{1-y}Mn_yPO_4$ or $Li_xCoPO_4$), iron sulfate ($Fe_2(SO_4)_3$), or a vanadium oxide (for example, $V_2O_5$). Herein, it is preferable that the above-described x and y satisfy $0<x\leq 1$ and $0>y\leq 1$.

As the polymer used for the positive electrode active material, for example, it is possible to use a conductive polymer material such as polyaniline or polypyrrole, or a disulfide-based polymer material. Also, an inorganic material and an organic material such as sulfur (S) or carbon fluoride can be exemplified as the positive electrode active material.

Among the above-described examples, preferable examples of the positive electrode active materials include a lithium-manganese composite oxide ($Li_xMn_2O_4$) having a high positive electrode voltage, a lithium-nickel composite oxide ($Li_xNiO_2$), a lithium-cobalt composite oxide ($Li_xCoO_2$), a lithium-nickel-cobalt composite oxide ($Li_xNi_{1-y}Co_yO_2$), a lithium-manganese-nickel composite oxide having a spinel structure ($Li_xMn_{2-y}Ni_yO_4$), a lithium-manganese-cobalt composite oxide ($Li_xMn_yCo_{1-y}O_2$) and a lithium-iron phosphate ($Li_xFePO_4$). It is preferable that the above-described x and y satisfy $0<x\leq 1$ and $0\leq y\leq 1$.

More preferable examples of the positive electrode active materials include a lithium-cobalt composite oxide and a lithium-manganese composite oxide. These positive electrode active materials have high ion conductivity, and thus, the diffusion of lithium ions in the positive electrode active material hardly becomes a rate-determining step in the combination with the aforementioned negative electrode active material. For this reason, the positive electrode active material containing the above composition is excellent in compatibility with the lithium-titanium composite oxide in the negative electrode active material.

When an ambient temperature molten salt is used as the nonaqueous electrolyte, it is preferable to use a lithium iron phosphate, $Li_xVPO_4F$, a lithium-manganese composite oxide, a lithium-nickel composite oxide, or a lithium-nickel-cobalt composite oxide in terms of a cycle lifespan. This is because the reactivity between the positive electrode active material and the ambient temperature molten salt becomes low.

The electroconductive agent improves the electric power collection performance of the positive electrode active material and suppresses contact resistance between the positive electrode active material and the positive electrode current collector 5a. Examples of the electroconductive agent include an agent containing acetylene black, carbon black, artificial graphite, natural graphite, a conductive polymer or the like.

The binder fills spaces among the dispersed positive electrode active materials to thereby bind the positive active material and the electroconductive agent, and bind the positive electrode active material and the positive electrode collector 5a. Examples of the binder include agents containing polytetrafluoroethylene (PTFE), polyvinylidene fluoride (PVdF), and fluorine-based rubber. As the binder, modified PVdF in which at least one group is substituted by another substituent, a copolymer of vinylidene fluoride and propylene hexafluoride, and a terpolymer of polyvinylidene fluoride, tetrafluoroethylene and propylene hexafluoride can be used in association with the above materials.

Also, as an organic solvent dispersing the binder, for example, it is possible to use N-methyl-2-pyrrolidone (NMP), dimethylformamide (DMF) or the like.

In the positive electrode layer 5b, the positive electrode active material and the binder are preferably blended at ratios of 80 mass % or more and 98 mass % or less, and 2 mass % or more and 20 mass % or less, respectively. By setting the amount of the binder to 2 mass % or more, it is possible to obtain sufficient electrode strength. By setting the amount of the binder to 20 mass % or less, it is possible to reduce a blending amount of insulator of the electrode and to reduce internal resistance.

Also, when the electroconductive agent is added to the positive electrode layer 5b, the positive electrode active material, the electroconductive agent, and the binder are preferably blended at ratios of 77 mass % or more and 95 mass % or less, 2 mass % or more and 20 mass % or less, and 3 mass % or more and 15 mass % or less, respectively, and more preferably blended at ratios of 80 mass % or more and 95 mass % or less, 3 mass % or more and 18 mass % or less, and 2 mass % or more and 17 mass % or less, respectively.

By setting the content of the electroconductive agent to 3 mass % or more, it is possible to obtain the above-described advantages. By setting the content of the electroconductive agent to 18 mass % or less, it is possible to reduce the decomposition of the nonaqueous electrolyte on the surface of the electroconductive agent in high-temperature preservation.

The positive electrode current collector 5a is preferably, for example, an aluminum foil or an aluminum alloy foil containing an element such as Mg, Ti, Zn, Mn, Fe, Cu, or Si, which has the thickness of 8 µm to 25 µm. Also, as the positive electrode collector 5a it is possible to use a stainless foil, a titanium foil or the like.

When the above aluminum foil is used as the positive electrode current collector 5a, the purity of the aluminum foil is preferably 99% or more.

Also, when the above aluminum alloy foil is used as the positive current electrode collector 5a, it is preferable to suppress a content of a transition metal such as Fe, Cu, Ni or Cr to 1 mass % or less.

The positive electrode 5 can be produced, for example, by suspending the positive electrode active material, the electroconductive agent, and the binder in a general solvent to prepare a slurry, applying the slurry to the positive electrode current collector 5a and performing drying, and then performing pressing. Also, the positive electrode 5 may be produced by forming the positive electrode active material, the electroconductive agent, and the binder in a pellet form to make the positive electrode layer 5b, and disposing and forming this positive electrode layer on the positive electrode current collector 5a.

(4) Nonaqueous Electrolyte

As the nonaqueous electrolyte, for example, it is possible to use a liquid nonaqueous electrolyte prepared by dissolving a solute in an organic solvent or a gel-like nonaqueous electrolyte in which a liquid electrolyte and a polymer material are composited.

As a liquid nonaqueous electrolyte, it is preferable to use an electrolyte obtained by dissolving a solute in an organic solvent at a concentration of 0.5 mol/L or more and 2.5 mol/L or less.

Preferable examples of a solute include lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluoromethanesulfonate ($LiCF_3SO_3$), lithium bistrifluoromethylsulfonimide [$LiN(CF_3SO_2)_2$], [$LiN(C_2F_5SO_2)_2$], [$Li(CF_3SO_2)_3C$], and $LiB[(OCO)_2]_2$, and it is preferable to use at least one lithium solute selected from these.

The solute, which is hardly oxidized even at a high potential, is preferable, and $LiPF_6$ is most preferable.

Examples of the organic solvent include cyclic carbonates such as propylene carbonate (PC), ethylene carbonate (EC), or vinylene carbonate, chain carbonates such as diethyl carbonate (DEC), dimethyl carbonate (DMC), and methylethyl carbonate (MEC), cyclic ethers such as tetrahydrofuran (THF), 2-methyltetrahydrofuran (2MeTHF), and dioxolane (DOX), chain ethers such as dimethoxyethane (DME) and diethoxyethane (DEE), and γ-butyrolactone (GBL), acetonitrile (AN), and sulfolane (SL). These organic solvents can be used singly or in a mixed solvent form.

Among the above examples, preferable examples of the organic solvent include mixed solvents obtained by mixing at least two solvents selected from the group consisting of propylene carbonate (PC), ethylene carbonate (EC) and diethyl carbonate (DEC) and a mixed solvent containing γ-butyrolactone (GBL). By using these mixed solvents, it is possible to obtain a nonaqueous electrolyte secondary battery excellent in high-temperature characteristics.

Examples of the polymer material forming the gel-like nonaqueous electrolyte include a material containing polyvinylidene fluoride (PVdF), polyacrylonitrile (PAN), or polyethylene oxide (PEO).

Also, as the nonaqueous electrolyte, it is possible to use a lithium ion-containing ambient temperature molten salt (ionic melt). For example, when selecting an ionic melt, which is formed of lithium ions, organic cations and anions and is a liquid at a temperature 100° C. or lower and preferably even at a temperature room temperature or lower, it is possible to obtain the nonaqueous electrolyte battery having a wide range of operation temperature.

(5) Separator

As the separator 4, for example, it is possible to use a porous film containing polyethylene, polypropylene, cellulose or polyvinylidene fluoride (PVdF), or a nonwoven fabric made of a synthetic resin. Examples of the porous film which is preferably used for the separator 4 include a film made of polyethylene, polypropylene, or both thereof. The separator 4 formed from this material is preferable because the separator is melted when a battery temperature increases and reaches a certain temperature, which makes it easy to add a shutdown function of blocking pores and considerably attenuating a charge and discharge current, and is able to improve safety of the nonaqueous electrolyte secondary battery. Also, in terms of cost reduction, it is preferable to use the separator 4 formed from a cellulose-based material.

Figure 10:
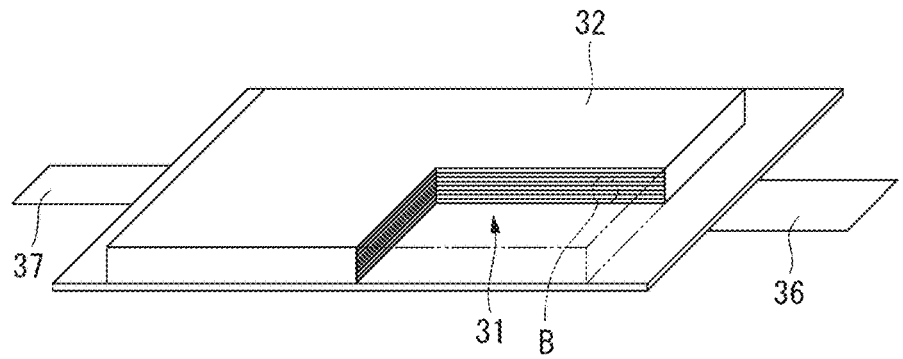
FIG. 10 is a partial cutout perspective view schematically illustrating another example of the nonaqueous electrolyte secondary battery according to the 2nd embodiment.
Figure 11:
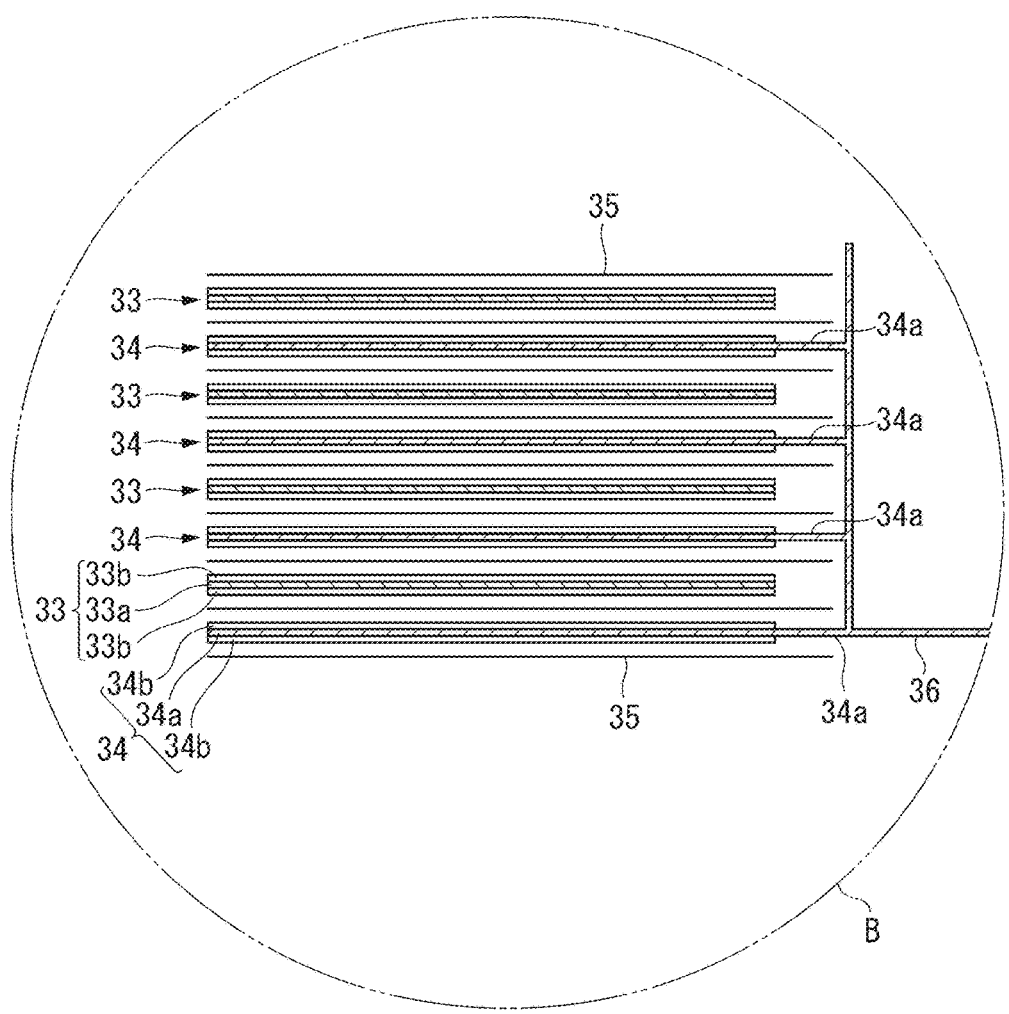
FIG. 11 is an enlarged schematic cross-sectional view of the part B of FIG. 10.

The configuration of the nonaqueous electrolyte secondary battery according to the 2nd embodiment is not limited to the aforementioned configuration illustrated in FIG. 8 and FIG. 9. For example, the nonaqueous electrolyte secondary battery according to the 2nd embodiment can be the battery having the configuration illustrated in FIG. 10 and FIG. 11. FIG. 10 is a partial cutout perspective view schematically illustrating another nonaqueous electrolyte secondary battery according to the 2nd embodiment. FIG. 11 is an enlarged schematic cross-sectional view of the part B of FIG. 10.

The nonaqueous electrolyte secondary battery illustrated in FIG. 10 and FIG. 11 is configured such that the lamination type electrode group 31 is housed in the exterior member 32. As illustrated in FIG. 11, the lamination type electrode group 31 has the structure in which the positive electrodes 33 and negative electrodes 34 are alternately laminated while interposing separators 35 therebetween.

The plurality of positive electrodes 33 is present, and each includes the positive electrode current collector 33a and the positive electrode layers 33b supported on both surfaces of the positive electrode current collector 33a. The positive electrode layer 33b contains the positive electrode active material.

The plurality of negative electrodes 34 is present, and each includes the negative electrode current collector 34a and the negative electrode layers 34b supported on both surfaces of the negative electrode current collector 34a. The negative electrode layer 34b contains the negative electrode active material. This negative electrode active material contains the active material according to the 1st embodiment. One side of the negative electrode current collector 34a of each negative electrode 34 protrudes from the negative electrode 34. The protruding negative electrode current collector 34a is electrically connected to the strip-shaped negative electrode terminal 36. The front end of the strip-shaped negative electrode terminal 36 is drawn from the exterior member 32 to the outside. Although not illustrated, in the positive electrode current collector 33a of the positive electrode 33, the side located opposite to the protruding side of the negative electrode current collector 34a protrudes from the positive electrode 33. The positive electrode current collector 33a protruding from the positive electrode 33 is electrically connected to the strip-shaped positive electrode terminal 37. The front end of the strip-shaped positive electrode terminal 37 is located on an opposite side to the negative electrode terminal 36, and is drawn from the side of the exterior member 32 to the outside.

The material, a mixture ratio, dimensions, and the like of each member included in the nonaqueous electrolyte secondary battery illustrated in FIG. 10 and FIG. 11 are configured to be the same as those of each constituent member of the nonaqueous electrolyte secondary battery 100 described in FIG. 8 and FIG. 9.

The nonaqueous electrolyte secondary battery of the present embodiment described above is excellent in the first-time charge and discharge efficiency and the cycle characteristics.

(Third Embodiment)

Next, the battery pack of the 3rd embodiment is described in detail.

The battery pack of the present embodiment includes at least one of the nonaqueous electrolyte secondary batteries of the 2nd embodiment (i.e. single batteries). When the plural single batteries are included in the battery pack, the respective single batteries are arranged so as to be electrically connected in series, in parallel, or in series and parallel.

Figure 12:
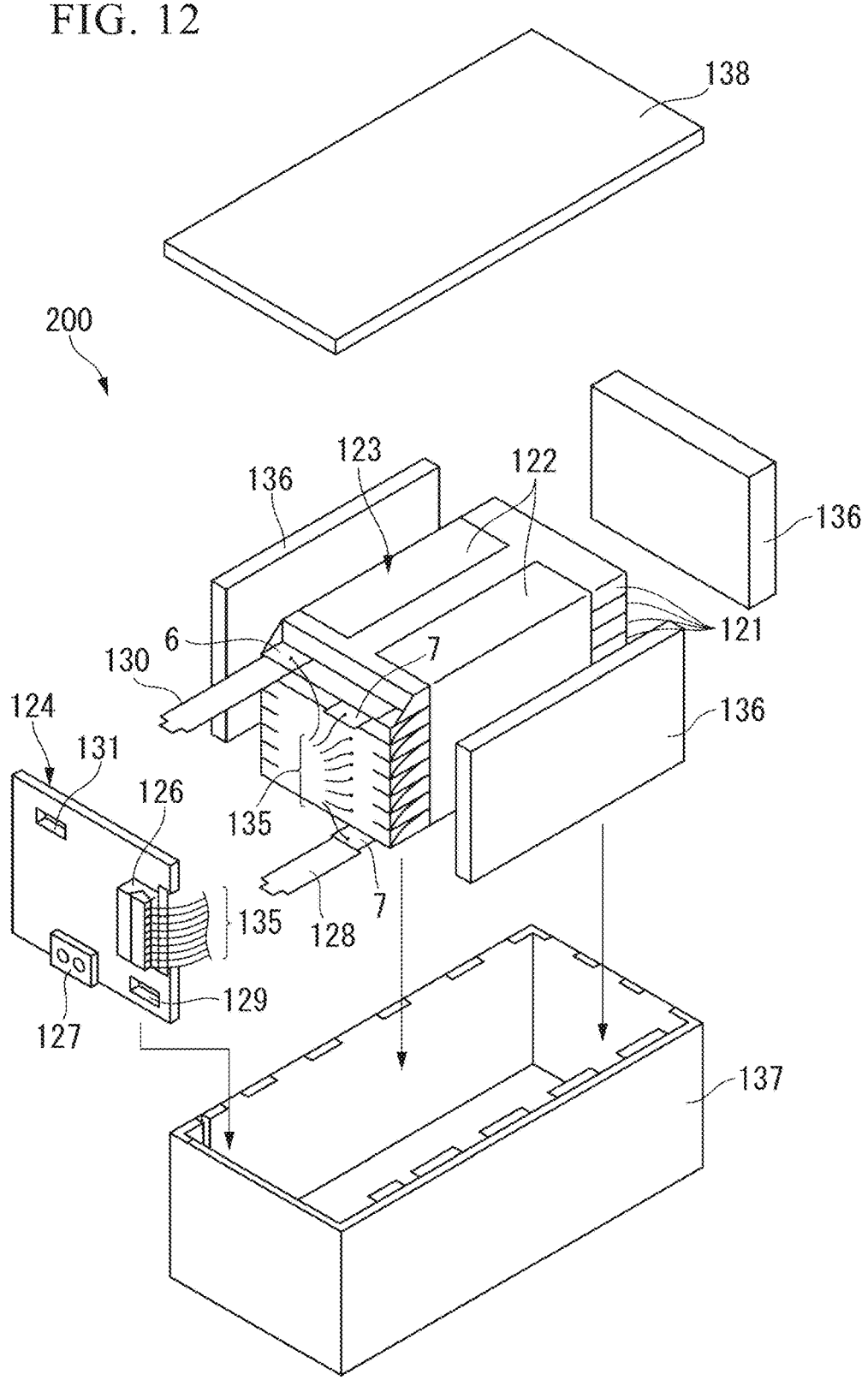
FIG. 12 is an exploded perspective view illustrating a battery pack according to the 3rd embodiment.
Figure 13:
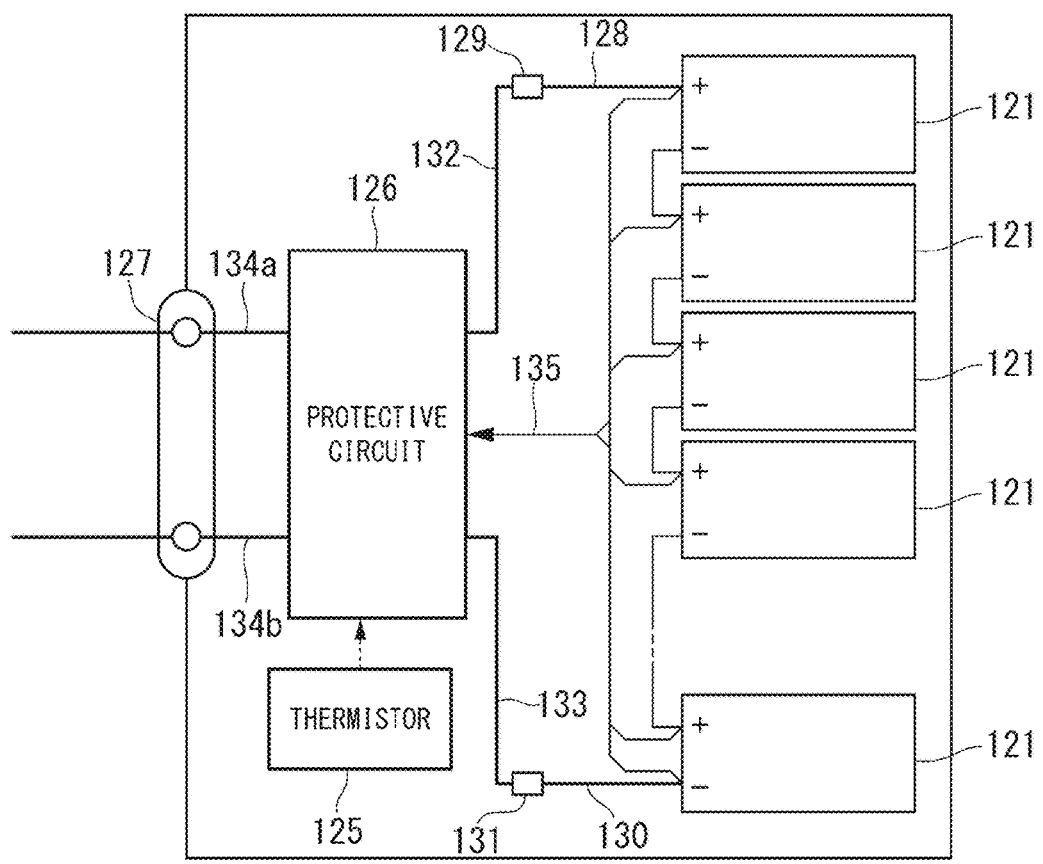
FIG. 13 is a block diagram illustrating the electric circuit provided in the battery pack illustrated in FIG. 12.

Referring to FIG. 12 and FIG. 13, the battery pack 200 according to the present embodiment is described in detail. In the battery pack 200 illustrated in FIG. 12, the nonaqueous electrolyte secondary battery 100 illustrated in FIG. 8 is used as the single battery 121.

The plural single batteries 121 are laminated so that the negative electrode terminals 6 and the positive electrode terminals 7 extending to the outside are arranged in the same direction, and thus the assembled batteries 123 are configured by fastening these with the adhesive tape 122. These single batteries 121 are connected mutually and electrically in series, as illustrated in FIG. 12 and FIG. 13.

The printed wiring board 124 is located so as to face the side surfaces of the single batteries 121 from which the negative electrode terminals 6 and the positive electrode terminals 7 extend. As illustrated in FIG. 12, the thermistor 125 (see FIG. 13), the protective circuit 126 and the energization terminal 127 for an external device are mounted on the printed wiring board 124. Herein, an insulation plate (unillustrated) is mounted on the surface of the printed wiring board 124 facing the assembled batteries 123 in order to avoid unnecessary connection with the wires of the assembled batteries 123.

The positive electrode-side lead 128 is connected to the positive electrode terminal 7 located in the lowermost layer of the assembled batteries 123, and the front end of the positive electrode-side lead is inserted into the positive electrode-side connector 129 of the printed wiring board 124 to be electrically connected. The negative electrode-side lead 130 is connected to the negative electrode terminal 6 located in the uppermost layer of the assembled batteries 123, and the front end of the negative electrode-side lead is inserted into the negative electrode-side connector 131 of the printed wiring board 124 to be electrically connected. These connectors 129, 131 are connected to the protective circuit 126 via wires 132, 133 (see FIG. 13) formed in the printed wiring board 124.

The thermistor 125 is used to detect a temperature of the single battery 121. Although not illustrated in FIG. 12, the thermistor is installed near the single batteries 121, and the detection signal thereof is transmitted to the protective circuit 126. The protective circuit 126 can block the plus-side wire 134*a* and the minus-side wire 134*b* between the protective circuit 126 and the energization terminal 127 for an external device under a predetermined condition. Here, for example, the predetermined condition means the case where the detection temperature of the thermistor 125 increases to a predetermined temperature or more. In addition, the predetermined condition also means the case of detecting an overcharge, overdischarge, overcurrent, or the like of the single battery 121. The detection of the overcharge or the like is performed for the respective single batteries 121 or the whole single batteries 121. Herein, when the overcharge or the like is detected in the respective single batteries 121, a battery voltage may be detected, or a positive electrode potential or a negative electrode potential may be detected. In the latter case, a lithium electrode, which is used as a reference electrode, is inserted into the respective single batteries 121. In the case of FIG. 12 and FIG. 13, the wires 135 for voltage detection are connected to the respective single batteries 121, and detection signals are transmitted to the protective circuit 126 via the wires 135.

As illustrated in FIG. 12, the protective sheets 136 formed from rubber or a resin are respectively placed on three side surfaces of the assembled batteries 123 other than the side surface from which the positive electrode terminals 7 and the negative electrode terminals 6 protrude.

The assembled batteries 123 are housed together with the respective protective sheets 136 and the printed wiring board 124 in the housing container 137. In other words, the protective sheets 136 are placed on both inner surfaces of the housing container 137 in the longer side direction and the inner surface of the housing container in the shorter side direction, and the printed wiring board 124 is placed on the inner surface opposite to the protective sheet 136 in the shorter side direction. The assembled batteries 123 are located in the space surrounded by the protective sheets 136 and the printed wiring board 124. The cover 138 is mounted on the upper surface of the housing container 137.

To fix the assembled batteries 123, a thermal shrinkage tape may be used instead of the adhesive tape 122. In this case, protective sheets are placed on both side surfaces of the assembled batteries, the thermal shrinkage tape is circled, and then the thermal shrinkage tape is subjected to thermal shrinkage so that the assembled batteries are fastened.

FIG. 12 and FIG. 13 illustrate the single batteries 121 connected in series, but in order to increase the battery capacity, the single batteries 121 may be connected in parallel or may be connected in a combination form of series connection and parallel connection. The assembled battery packs can also be further connected in series or in parallel.

The battery pack of the present embodiment described above is excellent in the first-time charge and discharge efficiency and the cycle characteristics.

Herein, the form of the battery pack can be appropriately modified according to a use application. A use application of the battery pack according to the embodiment is preferably one which is required to show excellent cycle characteristics when a large current is extracted. Specifically, the battery pack can be used for power of digital cameras, a two-wheeled or four-wheeled hybrid electric vehicle, a two-wheeled or four-wheeled electric vehicle, an assist bicycle, and the like. In particular, the battery pack obtained by using the nonaqueous electrolyte secondary batteries having excellent high temperature characteristics is appropriately used for vehicles.

EXAMPLES

Hereinafter, specific examples are described to explain the effect thereof.

Example 1

The active material was produced under the following conditions.

First, the silicon microparticles having the average particle size of 40 nm were added in the alumina crucible, and were subjected to the thermal treatment at 1200° C. for 1 hour in an Ar atmosphere, to thereby obtain the silicon-sintered body (the pretreatment step).

Next, the silicon-sintered body obtained in the pretreatment step was used to form the slurry containing the crushed particles and the carbon material in the procedure described below (the slurry formation step)

First, the resol resin (carbon precursor) 1.75 g that became the carbon material was dissolved in ethanol (dispersion medium) 10 g, to thereby obtain the dispersion solution. Then, the dispersion solution and the silicon-sintered body 1.25 g were mixed in a liquid phase by using the planetary ball mill and the balls formed from $ZrO_2$ having a diameter of 0.2 mm, and the silicon-sintered body was crashed to obtain the slurry. Thereafter, the slurry was subjected to the filtration to remove the balls contained in the slurry.

Next, the slurry, from which the balls were removed, was dried at 80° C. to remove ethanol, and was heated at 150° C. for 2 hours, to thereby obtain the complex of the crushed particles and the carbon precursor (hard carbon (non-graphitizable carbon)) (the complexing step).

Next, the obtained complex was fired at 1000° C. for 3 hours in an Ar atmosphere by using the electric furnace, to thereby obtain the active material (the firing step). Subsequently, the obtained active material was pulverized and sieved by using the sieve having the opening of 20 μm, to thereby obtain the active material of Example 1 having the particle size of 20 μm or less.

Example 2

The active material was produced in the same manner as in Example 1 except that the thermal treatment temperature was set 1100° C. in the firing step.

Example 3

The active material was produced in the same manner as in Example 2 except that the average particle size of the silicon microparticles was 20 nm.

Example 4

The active material was produced in the same manner as in Example 2 except that the average particle size of the silicon microparticles was 150 nm.

Comparative Example 1

The active material was produced in the same manner as in Example 1 except that the pretreatment was not carried out and the slurry formation step was carried out by using the silicon microparticle having the average particle size of 40 nm instead of the silicon-sintered body.

Comparative Example 2

The active material was produced in the same manner as in Comparative Example 1 except that the thermal treatment temperature was set 1100° C. in the firing step.

Comparative Example 3

The active material was produced in the same manner as in Example 3 except that the pretreatment was not carried out and the slurry formation step was carried out by using the silicon microparticle having the average particle size of 20 nm instead of the silicon-sintered body.

Comparative Example 4

The active material was produced in the same manner as in Example 4 except that the pretreatment was not carried out and the slurry formation step was carried out by using the silicon microparticle having the average particle size of 150 nm instead of the silicon-sintered body.

(Charge and Discharge Test)

The active materials of Examples 1-4 and Comparative Examples 1-4 were used to produce the test batteries in the following manner, and these test batteries were subjected to the charge and discharge test.

In other words, the active material 0.6 g and the graphite powder 0.1 g having an average particle size of 3 μm (the electroconductive agent) were added in the N-methyl-2-pyrrolidone (NMP) solution in which polyimide that was the binder was dissolved at 16 weight %, and the solution was mixed using a mixer, to thereby obtain the pasty slurry. The obtained slurry was applied onto the copper foil having a thickness of 12 μm, and then was dried, pressed and subjected to the thermal treatment at 400° C. for 2 hours in an argon gas, to thereby form the electrode layer on the copper foil.

The copper foil, on which the electrode layer was formed, was cut in the size of 20 mm height×20 mm width, and then, was dried under vacuum at 100° C. for 12 hours, to thereby obtain the test electrode. Then, the electrodes formed from the metal Li were prepared as the counter electrode and the reference electrode, and the mixed solution of ethylene carbonate (EC) and diethyl carbonate (DEC) containing $LiN(CF_3SO_2)_2$ as the solute (volume ratio EC:DEC=1:2) was prepared as the electrolyte. The test electrode, the counter electrode, the reference electrode and electrolyte were used to the test battery, and this test battery was subjected to the charge and discharge test. The assembly of the test battery was completely carried out in the glove box filled with an argon atmosphere.

Regarding the conditions for the charge and discharge test, the charge was carried out at a current density of 2 $mA/cm^2$ until the electrical potential difference between the reference electrode and the test electrode became 0.01 V, and moreover, the constant voltage charge was carried out at 0.01 V for 16 hours. The discharge was carried out at a current density of 1 $mA/cm^2$ to reach 1.5 V. The charge capacity (initial capacity) was measured in this test, and the ratio of the discharge capacity to the initial charge capacity was calculated as the first-time charge and discharge efficiency (initial efficiency).

The active materials obtained in Examples 1-4 and Comparative Examples 1-4 were examined by using the transmission electron microscope (TEM), to observe the formation of the twinned crystal and the thickness of the silicon compound layer between the silicon particle and the carbon layer. As a result, it was observed that, in Examples 1-4, the silicon particles were bonded and the twinned crystal was formed between the bonded adjacent silicon particles. By contrast, the twinned crystal was not confirmed in Comparative Examples 1-4.

Figure 18:
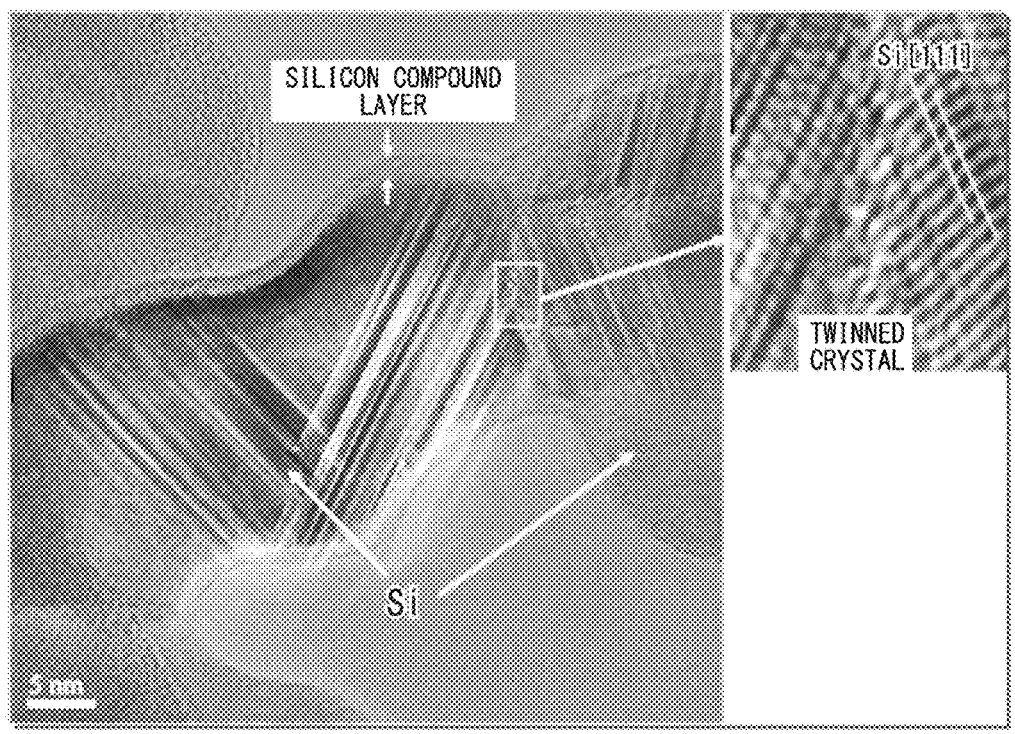
FIG. 18 is the transmission electron microscope (TEM) photograph of the active material of Example 3.

As an example, FIG. 18 shows the result of the observation of the active material of Example 3 by using the transmission electron microscope (TEM). As shown in FIG. 18, it was observed that the silicon particles were bonded and the twinned crystal was formed between the bonded adjacent silicon particles. Also, the silicon compound layer having the thickness of 2 nm was observed between the silicon particle and the carbon layer.

Table 1 summarizes the presence or absence of the twinned crystal, the thickness of the silicon compound layer between the silicon particle and the carbon layer, the particle size of the silicon microparticle used as the raw material of the active material, the presence or absence of the pretreatment step, the thermal treatment temperature in the firing step, and the results of the charge and discharge test (the initial capacity and the initial efficiency) in Examples 1-4 and Comparative Examples 1-4.

TABLE 1

| | Presence or Absence of Twinned Crystal | Thickness of Silicon Compound Layer (nm) | Particle Size of Silicon Microparticle (nm) | Presence or Absence of Pretreatment Step | Thermal Treatment Temperature (° C.) | Initial Capacity (mAh/g) | Initial Efficiency (%) |
|---|---|---|---|---|---|---|---|
| Example 1 | Presence | 3 | 40 | Presence | 1000 | 2444 | 84.6 |
| Example 2 | Presence | 4 | 40 | Presence | 1100 | 2327 | 84.3 |
| Comparative Example 1 | Absence | 2 | 40 | Absence | 1000 | 2073 | 80.6 |
| Comparative Example 2 | Absence | 2 | 40 | Absence | 1100 | 1650 | 79.4 |
| Example 3 | Presence | 2 | 20 | Presence | 1100 | 1580 | 76.2 |
| Comparative Example 3 | Absence | 3 | 20 | Absence | 1100 | 1032 | 69.1 |
| Example 4 | Presence | 2 | 150 | Presence | 1100 | 2290 | 84.2 |
| Comparative Example 4 | Absence | 4 | 150 | Absence | 1100 | 1748 | 79.5 |

As shown in Table 1, the initial capacities and the initial efficiencies were respectively improved in Examples 1-4, in which the twinned crystals were observed, as compared with Comparative Examples 1-4 in which the twinned crystals were not observed.

According to the comparison of the results of Example 1 and Comparative Example 1 and the results of Example 2 and Comparative Example 2, respectively, the effect of improving the initial capacity and the initial efficiency was significant when the thermal treatment temperature was set to 1100° C. in the firing step as compared with when the thermal treatment temperature was set to 1000° C. in the firing step.

Also, according to the comparison of Example 1 and Example 2, the values of the initial capacity and the initial efficiency of Example 1 were higher, but the difference between Example 1 and Example 2 were small. Herein, the thermal treatment temperature in the firing step of Example 2 was higher than that of Example 1, and thus, the carbon layer having the higher effect of suppressing the volume expansion of the active material was formed. For this reason, the capacity retention rate during the cycle was improved. Specifically, the discharge capacity retention rate at the 50th cycle (the ratio of the discharge capacity at the 50th cycle to the discharge capacity at the 1st cycle) was 92% in Example 1, and was 95% in Example 2.

According to the comparison of Example 2 in which the particle size of the silicon particle was 40 nm, and Example 3 in which the particle size of the silicon particle was 20 nm, the initial capacity and the initial efficiency of Example 2 were higher. The reason is estimated as follows. When the particle size of the silicon microparticle is large, the area of the silicon compound layer formed in the firing step is relatively small in the active material. For this reason, the initial capacity and the initial efficiency was more increased in Example 2.

Also, in Example 2 and Example 3, the compositions of the silicon microparticles before the pretreatment step and the compositions of the active materials were analyzed by the inductively coupled plasma (ICP) emission spectrometry using the internal standard method (the device was manufactured by Hitachi High-Tech Science Corporation) and the infrared absorption method (the device was manufactured by LECO Corporation). The Si atom of the compositions was analyzed by the inductively coupled plasma emission spectrometry, and the O atom of the compositions was analyzed by the infrared absorption method. Then, the respective molar ratios (Si/O) of Si to O were calculated. Also, in Comparative Example 2 and Example 3, the compositions of the active materials were analyzed in the same manner as in Example 2 and Example 3, and then the respective molar ratios (Si/O) of Si to O were calculated.

As a result, in Example 2, the molar ratio (Si/O) of Si to O of the silicon microparticle before the pretreatment step was 82.5, and the molar ratio (Si/O) of the active material was 4.4. Also, the molar ratio (Si/O) of the active material in Comparative Example 2 was 1.9.

In Example 3, the molar ratio (Si/O) of Si to O of the silicon microparticle before the pretreatment step was 18.6, and the molar ratio (Si/O) of the active material was 2.1. Also, the molar ratio (Si/O) of the active material in Comparative Example 3 was 1.7.

In Example 2 and Example 3, the molar ratios (Si/O) of the active materials increase as compared with Comparative Example 2 and Comparative Example 3 having no pretreatment step. This could be because the oxidation of the silicon in the firing step was suppressed by carrying out the pretreatment step.

Figure 14:
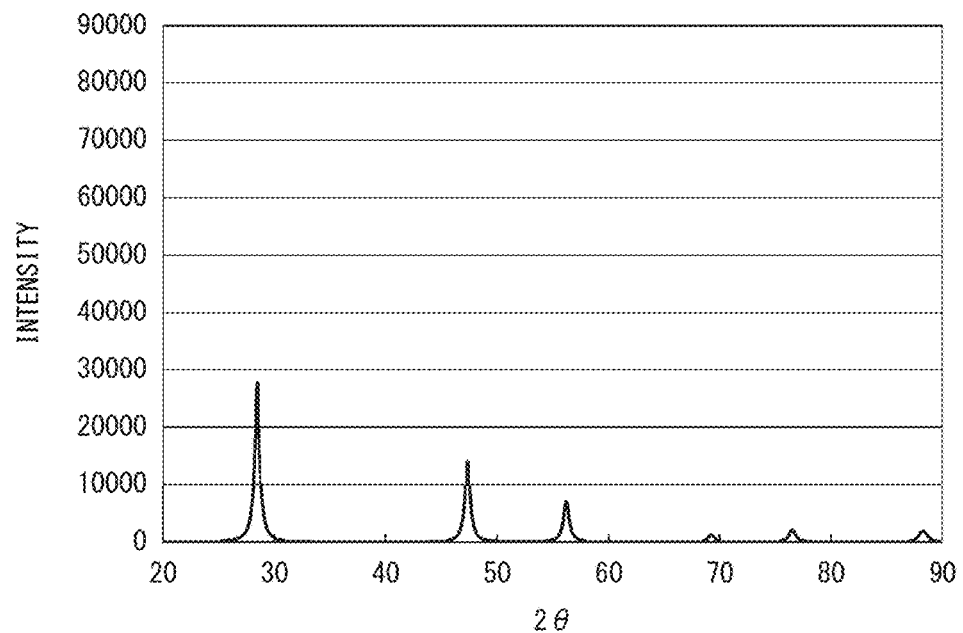
FIG. 14 is the graph showing the X-ray diffraction spectrum of the silicon microparticle.
Figure 15:
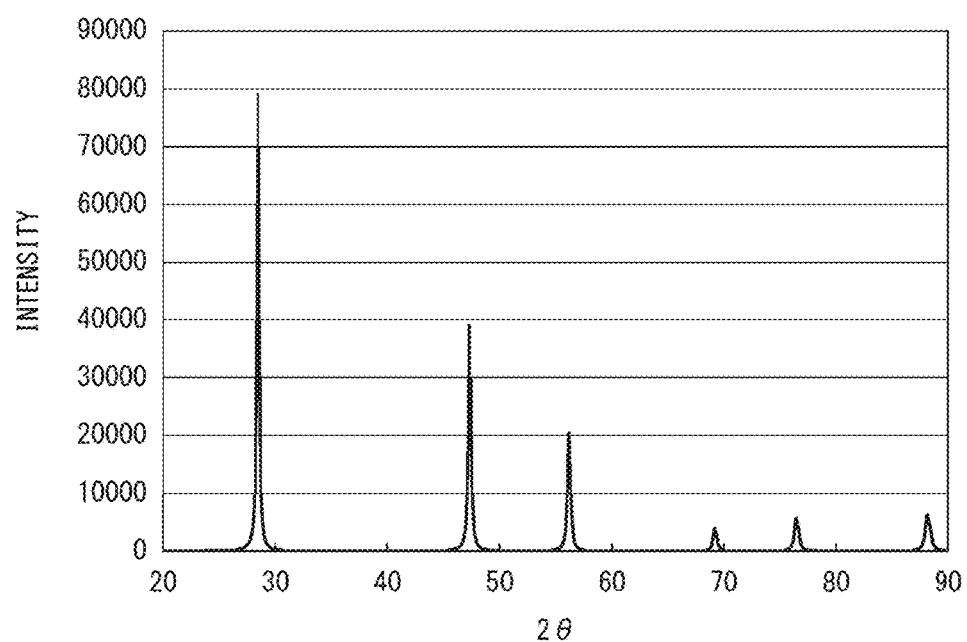
FIG. 15 is the graph showing the X-ray diffraction spectrum of the silicon-sintered body.

Also, in Example 3, the silicon microparticle before the pretreatment step and the silicon-sintered body obtained in the pretreatment step were subjected to the X-ray diffraction analysis. The results are shown in FIG. 14 and FIG. 15. FIG. 14 is the graph showing the X-ray diffraction spectrum of the silicon microparticle. FIG. 15 is the graph showing the X-ray diffraction spectrum of the silicon-sintered body.

According to FIG. 14 and FIG. 15, the peak attributed to the silicon in the X-ray diffraction spectrum of the silicon-sintered body shown in FIG. 15 was sharper and stronger than that of the silicon microparticle before the pretreatment step shown in FIG. 14. From this result, it was found that the crystallinity was improved by carrying out the pretreatment step.

Figure 16:
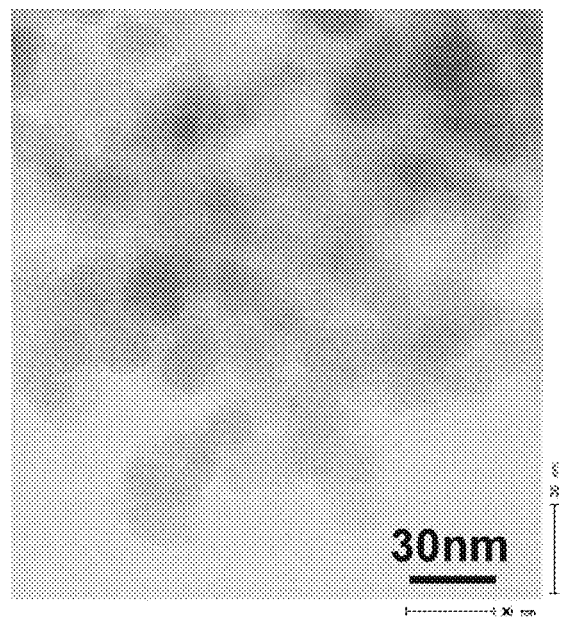
FIG. 16 is the transmission electron microscope (TEM) photograph of the silicon microparticles.
Figure 17:
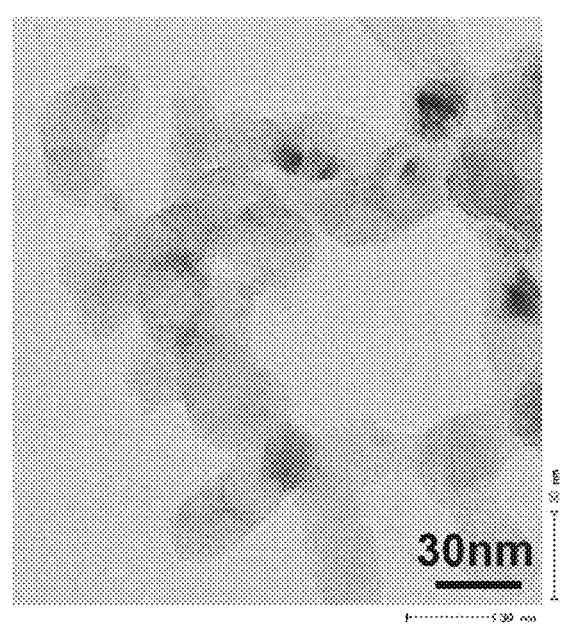
FIG. 17 is the transmission electron microscope (TEM) photograph of the silicon-sintered body.

Also, in Example 3, the silicon microparticle before the pretreatment step and the silicon-sintered body obtained in the pretreatment step were observed by the transmission electron microscope (TEM). The results are shown in FIG. 16 and FIG. 17. FIG. 16 is the transmission electron microscope (TEM) photograph of the silicon microparticles. FIG. 17 is the transmission electron microscope (TEM) photograph of the silicon-sintered body.

As shown in FIG. 16 and FIG. 17, the particle size change is not observed between the silicon microparticle before the pretreatment step and the silicon-sintered body obtained in the pretreatment. Also, as shown in FIG. 17, it was observed that the silicon microparticles were bonded by the pretreatment step.

According to at least one of the embodiments described above, the active material includes the core particle, which is formed of the silicon particles having the twinned crystal in part of the surface, and the carbon layer which coats the core particle, and thus, it is possible to provide the nonaqueous electrolyte secondary battery excellent in the first-time charge and discharge efficiency and the cycle characteristics.

While certain embodiments have been described, these embodiments have been presented by way of example only, and are note intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:
1. An active material, comprising:
   a core particle which is formed of one or more silicon particles having a twinned crystal in part of a surface; and
   a carbon layer which coats the core particle.
2. The active material according to claim 1, wherein the core particle has a silicon particle group formed by bonding the one or more silicon particles.
3. The active material according to claim 1, further comprising:
   a silicon compound layer in part of a space between the one or more silicon particles and the carbon layer.
4. The active material according to claim 3, wherein the silicon compound layer comprises a carbon-containing silicon compound.
5. The active material according to claim 3, wherein a thickness of the silicon compound layer is within a range of 1 nm or more and 10 nm or less.
6. An electrode, comprising:
   a current collector; and
   an active material supported on one surface or both surfaces of the current collector,
   wherein the active material is the active material according to claim 1.
7. A nonaqueous electrolyte secondary battery, comprising the electrode according to claim 6.

8. A battery pack, comprising the nonaqueous electrolyte secondary battery according to claim 7.

9. A production method of the active material according to claim 1, the method comprising:
pretreating, by subjecting one or more silicon microparticles to a thermal treatment at a temperature of 1000° C. to 1300° C., to thereby form a silicon-sintered body in which the one more silicon microparticles are bonded in a form of twinned crystal;
forming a slurry, by mixing the silicon-sintered body with a carbon material and crushing the silicon-sintered body to obtain crushed particles, to thereby form a slurry containing the crushed particles and the carbon material;
performing a complexing, in which the slurry is fired to form a complex of the crushed particles and a carbon precursor; and
firing, in which the complex is fired for 10 minutes to 12 hours at a temperature of 700° C. to 1200° C.

10. The active material according to claim 1, wherein the one or more silicon particles do not contain a silicon compound.

\* \* \* \* \*